United States Patent Office 3,252,999
Patented May 24, 1966

3,252,999
DERIVATIVES OF 5-AMINO-2,3-DIHYDRO-2-
METHYL BENZOFURAN
David R. Herbst, King of Prussia, Pa., assignor to American Home Products Corporation, New York, N.Y., a corporation of Delaware
No Drawing. Filed Nov. 1, 1963, Ser. No. 320,859
7 Claims. (Cl. 260—346.2)

This invention relates to new benzofuran compounds. More particularly this invention relates to derivatives of 5-amino-2,3-dihydro-2-methyl benzofuran and to the novel method by which they are prepared.

The new compounds of the present invention, considered in their broadest aspect are encompassed within the compounds defined by Formula I below:

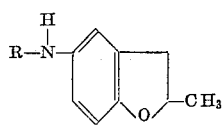

(I)

wherein R is a member of the group consisting of (1)

wherein $R^1$ is selected from the group consisting of alkyl and alkenyl and X is selected from the group consisting of =O and =S and (2) $NH_2$—C(:NH)NHC(:NH)—; and the therapeutically acceptable acid addition salts of the latter. In the foregoing formula, the alkyl and alkenyl hydrocarbon groups are preferably lower, that is have 5 carbon atoms or less in straight or branched chain configuration.

The compounds encompassed within Formula I above are prepared according to the method of the present invention by reacting a 5-amino-2-methyl coumaran hydrochloride with a selected isocyanate or isothiocyanate compound or dicyanodiamide.

In carrying out the reaction, the substituted coumaran hydrochloride starting material, is first prepared from 2-methylcoumaran (D. S. Tarbell, Organic Reactions, 2, 27) by the method of R. T. Arnold and J. C. McCool [J. Am. Chem. Soc., 64, 1316 (1942)]. Hereafter the latter, 5-amino-2-methyl coumaran hydrochloride, will be identified for convenience as the starting material or compound II.

Treatment of starting compound II with an alkali metal alkoxide such as sodium methoxide affords the free base of II which is isolated and is treated with a selected isocyanate such as butylisocyanate by refluxing the same for a period of from about one to about four hours in the presence of a suitable inert solvent. The solvent is removed and the residue dissolved in ether or an equivalent solvent. After washing with dilute material acid followed by water wash and drying, evaporation of solvent provides the desired product. When an isothiocyanate is employed, a mixture of the starting compound II, sodium methoxide and methanol, is treated directly and is refluxed from one to about four hours, freed of solvent and the residue worked up as above, thus providing the desired product.

The new compounds of the present invention possess properties making them useful as pharmaceuticals. Specifically, it has been found that the compounds of the present invention are useful as hypoglycemic, diuretic and anti-hypertensive agents. They are also effective as antidepressants and anticonvulsants.

When used for the purposes described, the new compounds of the present invention are preferably formed into a pharmaceutical preparation. The latter contains the specified compounds in admixture with a pharmaceutically administrable organic or inorganic carrier, such that the composition is suitable for enteral or parenteral administration. The composition may be prepared in solid form, such as in pills or tablets, or in liquid form such as a solution, suspension or emulsion. Suitable liquid carriers include water, gelatin, lactose, starch, talc, vegetable oils, alcohols including polyalcohols, gums, USP syrups and the like. The pharmaceutical composition in addition to the active principle and the carrier may also include auxiliary materials such as coloring, stabilizing, wetting or emulsifying agents. It is of course recognized as essential that the carrier as well as any other materials present in combination with the active principle be inert with respect thereto.

Reference now to the examples which follow will provide a better understanding of the new compounds of the present invention and of the method by which they are prepared.

Example I

After stirring 10 min., a mixture of 9.28 g. of 5-amino-2-methyl coumaran hydrochloride, 250 ml. absolute ethanol and 2.70 g. sodium methoxide is treated with 4.21 g. allyl isothiocyanate; and the mixture is refluxed 4 hours. The solvent is removed and the residue is dissolved in ether, washed with 2 N HCl, water, dried ($Na_2SO_4$) and the solvent distilled. Trituration of the crude product with n-hexane and crystallization (twice) from isopropanol gives 7.30 g. (59%) 1-allyl-3-(2,3-dihydro-2-methyl-5-benzofuranyl)-2-thiourea, M.P. 86.5–89.0° C.

$\lambda_{max}^{KBr}$ 3.04, 3.23, 11.06$\mu$, $\lambda_{max}^{95\% EtOH}$ 249.5 ($\epsilon$ 16,560) m$\mu$

Example II

According to the method of Example I, isopropyl isothiocyanate is reacted with starting material II to produce 1-isopropyl-3-(2,3-dihydro - 2 - methyl - 5-benzofuranyl)-2-thiourea.

Example III

To 6.30 g., II in 30 ml. methanol is added 1.83 g. sodium methoxide and the mixture is filtered after stirring for 5 min. Solvent is distilled, the residue is dissolved in 50 ml. benzene, 3.53 g. butyl isocyanate is added and the solution is refluxed 1 hour. Removal of the benzene and dissolution of the residue in chloroform, washing with 2 N HCl, water, drying ($Na_2SO_4$) and evaporation of the solvent gives the crude product. Crystallization of this material from acetone-n-hexane and from acetone yields 5.75 g. (68%) 1-butyl-3-(2,3-dihydro-2-methyl-5-benzofuranyl)urea M.P. 141–153° C.

$\lambda_{max}^{KBr}$ 3.04, 6.12$\mu$, $\lambda_{max}^{95\% EtOH}$ 247.5 ($\epsilon$ 16,200) m$\mu$

Example IV

Following the procedure of Example III, 1-ethyl-3-(2,3-dihydro-2-methyl-5-benzofuranyl)urea is prepared by reacting II with ethyl isocyanate.

Example V

Following the procedure of Example I, starting material II is reacted with methyl isothiocyanate to produce 1-methyl-3-(2,3 - dihydro - 2 - methyl - 5 - benzofuranyl)-2-thiourea.

Example VI

A solution of 6.36 g. II, 2.88 g. of dicyandiamide, 15 ml. water and 0.1 ml. conc. HCl is refluxed 1 hour and then is chilled at 8° C./19 hours. The solids are collected, dissolved in a solution of 2.0 ml. 2 N HCl-100 ml. water and the solution is washed with ether, saturated with sodium chloride, basified with 25 ml. 10% w./v. aq. sodium hydroxide and extracted with chloroform. Washing of the chloroform fraction with brine, drying ($Na_2SO_4$), and distillation of the solvent gives crude biguanide. Dissolution of the solids in 25 ml. methanol, acidification with 1.3 ml. conc. HCl and addition of 250 ml. ether gives a salt. Purification of the crude hydrochloride by dissolution in methanol and precipitation with ether (twice) affords 3.45 g. N-(2,3-dihydro-2-methyl-5-benzofuranyl) biguanide, monohydrochloride containing no more than 10% of the dihydrochloride, dec. 202–205° C. with sublimation $\lambda_{max}^{KBr}$ 3.07, 6.10$\mu$, $\lambda_{max}^{95\%}$ EtOH 236.5 ($\epsilon$ 12,730), 250–260 (plateau, $\epsilon_{255}$ 11,550) m$\mu$ While the foregoing invention has been described with some degree of particularity in the specific examples, it is to be understood that the invention is not to be limited thereby but is only to be limited by the claims appended hereto.

The invention claimed is:

1. A compound selected from the group consisting of a compound of the formula:

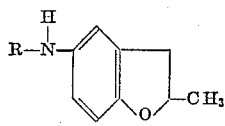

wherein R is a member of the group consisting of (1) 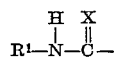

wherein $R^1$ is selected from the group consisting of lower alkyl and lower alkenyl and X is selected from the group consisting of =O and =S and (2)         $H_2NC(:NH)NHC(:NH)$— and the therapeutically acceptable acid addition salts of the latter.

2. 1-allyl-3-(2,3-dihydro-2 - methyl-5-benzofuranyl)-2-thiourea.

3. 1-ethyl-3-(2,3-dihydro - 2 - methyl-5-benzofuranyl) urea.

4. 1 - isopropyl - 3 - (2,3 - dihydro - 2 - methyl-5-benzofuranyl)-2-thiourea.

5. 1-butyl-3-(2,3-dihydro - 2 - methyl-5-benzofuranyl) urea.

6. 1-methyl-3-(2,3-dihydro-2 - methyl-5-benzofuranyl)-2-thiourea.

7. N-(2,3-dihydro-2-methyl-5-benzofuranyl)biguanide.

References Cited by the Examiner

UNITED STATES PATENTS 2,992,232    7/1961    Bloom            260—346.2

NICHOLAS S. RIZZO, *Primary Examiner.*

HENRY R. JILES, *Examiner.*